March 30, 1926.

G. H. GIBSON

HEATER REGULATION

Filed Feb. 6, 1920 — 4 Sheets-Sheet 1

1,578,280

Inventor
GEORGE H. GIBSON
By his Attorney
John E. Hubbell

Inventor
GEORGE H. GIBSON
By his Attorney
John E. Hubbell

March 30, 1926.  
G. H. GIBSON  
1,578,280  
HEATER REGULATION  
Filed Feb. 6, 1920  4 Sheets-Sheet 3
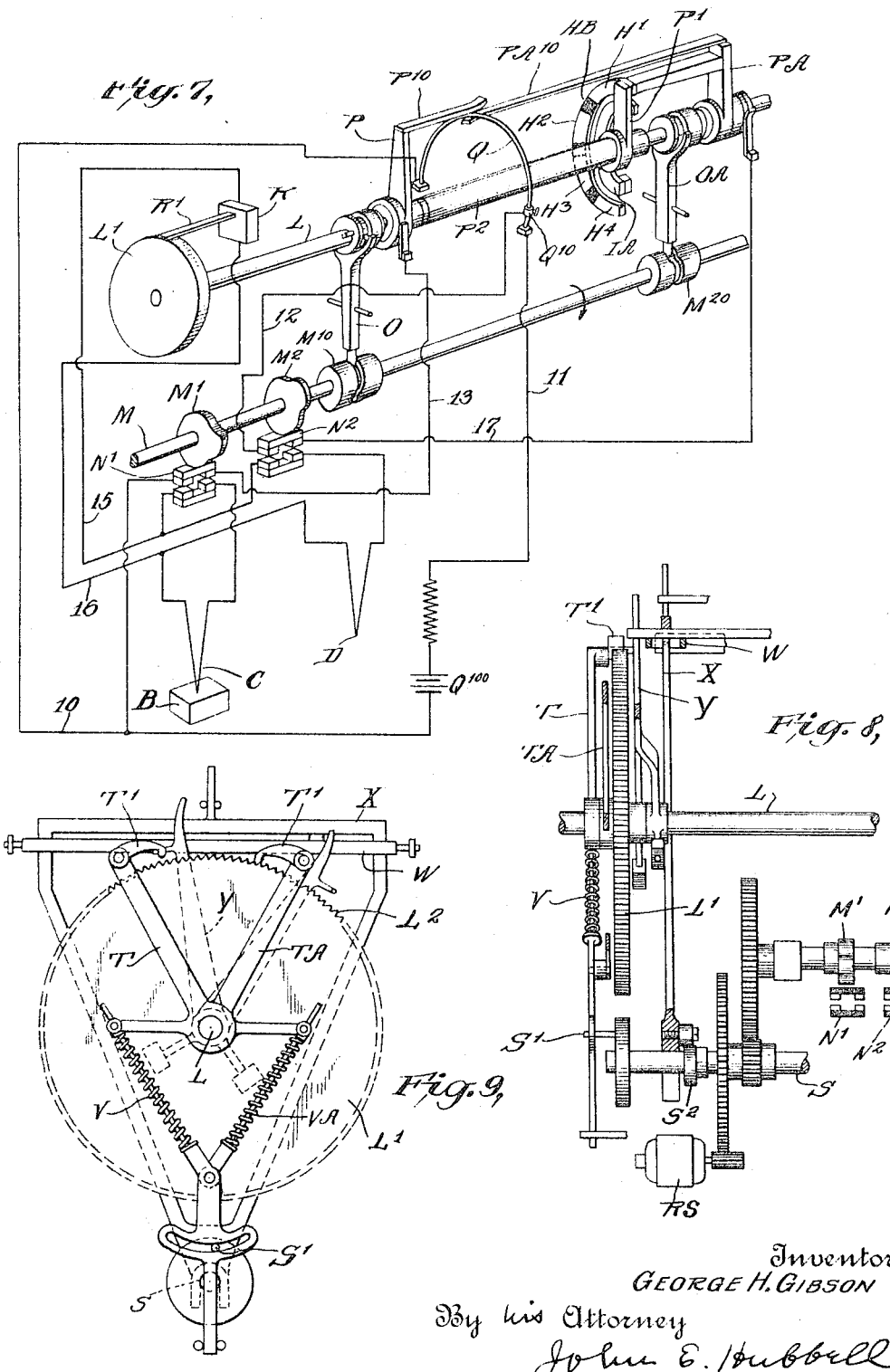
Inventor  
GEORGE H. GIBSON  
By his Attorney  
John E. Hubbell March 30, 1926. 1,578,280

G. H. GIBSON

HEATER REGULATION

Filed Feb. 6, 1920 4 Sheets-Sheet 4

Inventor
GEORGE H. GIBSON
By his Attorney
John E. Hubbell

Patented Mar. 30, 1926.

1,578,280

UNITED STATES PATENT OFFICE.

GEORGE HERBERT GIBSON, OF MONTCLAIR, NEW JERSEY.

HEATER REGULATION.

Application filed February 6, 1920. Serial No. 356,778.

*To all whom it may concern:*

Be it known that I, GEORGE H. GIBSON, citizen of the United States, and resident of Montclair, in the county of Essex and State of New Jersey, have invented certain new and useful Improvements in Heater Regulation, of which the following is a specification.

My present invention consists in an improved method of and apparatus for controlling the heat of a furnace.

The general object of my invention is to provide an effective method of, and apparatus for, regulating the heat supplied a heater in such manner as to heat the work or object to be heated with suitable rapidity to a predetermined temperature without risk of overheating the work and without any undue waste of the heat supplied to the heater. In carrying out my invention, I control the supply of heat to the heater in joint response to the temperature of the work and to the temperature of the heater. By proceeding in this manner I am able to bring the work with a desirable rapidity to its desired final temperature without risk of overheating the work because of the storage of heat in the heater beyond that required to complete the heating of the work, and I avoid fluctuations or "hunting" in the heating operation which make it more difficult to bring, and prolong the period required for bringing, the work to the exact final temperature desired.

In the practical carrying out of my invention, in controlling the temperature of an industrial furnace for example, I employ a thermostatic device responsive to the temperature of the work, such as a thermo-couple in contact with the work, and a separate thermostatic device responsive to the heater temperature, such as a thermo-couple exposed to the temperature of a highly heated portion of the heater, or of the source of heat for the latter, and vary the supply of heat to the furnace in response to variations in the joint or combined effects of the two devices, each of which is arranged to have a tendency to reduce the heat supply as its temperature increases. These thermostatic devices operate ordinarily through a suitable relay mechanism to control the fuel, valves, dampers, electric switches or the like, by which the supply of heat to the furnace is directly regulated.

The various features of novelty which characterize my invention are pointed out with particularity in the claims annexed to and forming a part of this specification. For a better understanding of my invention, however, and its specific objects and advantages, reference should be had to the accompanying drawings and descriptive matter, in which I have illustrated and described various modes and forms of apparatus by which my invention may be carried out.

Of the drawings:

Fig. 7 is a diagrammatic perspective of a portion of a preferred form of control mechanism;

Fig. 8 is a side elevation of a portion of the apparatus shown in Fig. 7;

Fig. 9 is an end view of the apparatus shown in Fig. 8;

Figure 1:
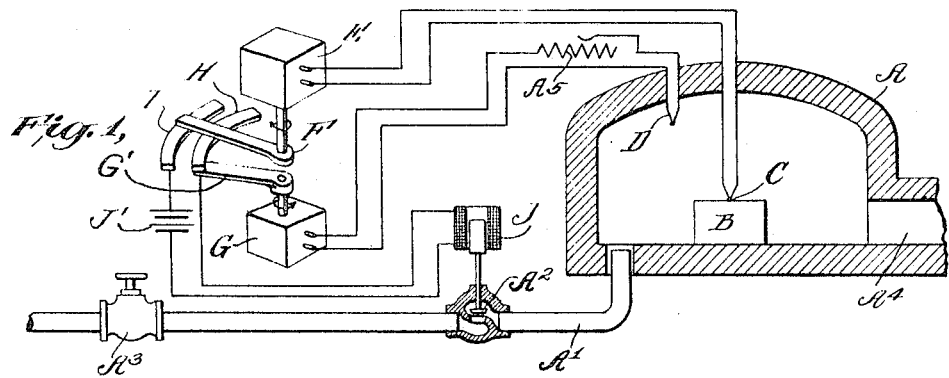
Fig. 1 is a diagrammatic representation with parts broken away and in section of a simple form of apparatus for controlling a flame heated furnace.

In Fig. 1 of the drawing I have diagrammatically illustrated the use of my present invention in connection with a gas heated furnace A of the reverberatory type to which gaseous fuel is supplied by a conduit A', the supply being regulated by the automatically controlled cutoff valve A². A³ represents a separate hand valve in the conduit A' and A⁴ represents the stack outlet from the furnace chamber. The work B shown in the furnace chamber may be a block of tool steel or any other object which is to be heated more or less gradually to a definite final temperature. Associated with the work B is a thermo-couple C having its hot junction near to, in contact with, or imbedded in the work. A second thermo-couple D has its hot junction located in one of the hottest portions of the furnace. The thermo-couple C is connected to a suitable instrument such as a sensitive galvanometer E, having an arm or needle F which turns in the direction of the arrow as the temperature of the work increases. The thermo-couple D is connected to a galvanometer or like instrument G, the arm or needle G' of which carries a contact arc H. The shaft of the instrument G, and thereby the contact arc H is turned in the direction indicated by the arrow as the temperature of the furnace thermocouple D increases. The instruments E and G are co-axially disposed and the needle F normally bears on the contact arc H and forms a bridge connecting it to a stationary arc shaped contact I. The contacts I and H are connected in series with an electro magnet J and a source of current J' for energizing the magnet whereby when the galvanometer arm F connects the contacts I and H the electromagnet J is energized. The automatic cutoff valve A² is connected to the armature of the electromagnet J and is held open when the latter is energized. When both work and furnace are cold, the needle F of the galvanometer E will be in contact with the arc H adjacent the left hand end of the latter as seen in Fig. 1. As the temperature of the work increases, the needle F turns in the clockwise direction, and as the temperature of the furnace increases the arc H turns in the counter clockwise direction. The energizing circuit for the electromagnet J will be opened and the valve A² will thereupon close, whenever the relative movement of the needle F and the arc H carry the needle F off the right hand end of the arc H. Irrespective of the position of arc H, the energizing circuit for the electromagnet J will be opened when the needle F moves beyond the right hand end of the stationary contact I which is so disposed that this separation will occur when the work B reaches the desired final temperature. By adjusting the position of the contact I the final maximum temperature can be varied. Ordinarily, however, the relative movement of the needle F and the contact H will cause these parts to separate and thus close the valve A² before the work is heated to the desired final temperature and the needle F has thereby been moved out of engagement with the stationary contact I.

The temperature of the work at the instant at which needle F separates from the contact H will depend upon the relation between the temperature of the work and the furnace temperature. When the furnace is much hotter than the work, the supply of heat to the furnace will be interrupted while the temperature of the work is still substantially below its final desired temperature but when the diffrence between the temperature of the work and the temperature of the furnace is not great, the temperature of the work will approach closely its final desired temperature before the supply of heat to the furnace is cut off.

This is as it should be. Assume for example that the desired final temperature of the work is 1500° and that with the work at a temperature of 1300°, the work will heat with reasonable rapidity to a final temperature of 1500° though no more heat be supplied to the furnace; that with the same work temperature, a furnace temperature at the time of the interruption of the heat supply of 1700° would result in overheating the work; while a furnace temperature of 1500° would be insufficient to bring the work up to the desired final temperature of 1500°. Under these conditions the apparatus may well be proportioned and adjusted so that the arm F and arc H will separate when the work and furnace temperatures are 1300° and 1600° respectively. Then, if for some reason, the furnace temperature is less than 1600° when the work reaches a temperature of 1300°, the needle F will not separate from the contact H, but the supply of heat will be continued to the furnace for some time. If, on the other hand, the furnace temperature rises above 1600° before the work temperature reaches 1300°, the supply of heat should be and and would be cut off by the apparatus before the work temperature rose to 1300°. In some cases the work and furnace temperatures may rise high enough to make it necessary to cut off the supply of heat to avoid overheating the surface of the work while a further supply of heat is necessary to bring the interior of the work to the desired final temperature or to maintain the work at that temperature for a sufficient period. In such cases the cooling of the furnace and the work surface will bring about a re-engagement of the needle F and contact H after a time and thereby secure the additional heat required. With the apparatus shown in Fig. 1 the positions of the needle F and contact H at any instant are measures of temperatures of the work and furnace, respectively. The angular movements of the needle F and contact H are each proportioned to the temperature variations thereby measured in the sense that each moves in one direction or the other a definite amount on a definite rise or fall in the corresponding temperature, though the movements need not, and in practice would not, be in exact linear proportion to the corresponding changes in temperature.

It will be apparent to those skilled in the art that by suitable changes in proportions of parts, electrical connections, or the like, the constants of the apparatus shown in Fig. 1 can be changed, so to speak, to vary the relation between the movements of the needle F and the contact H and the temperature of the work and furnace, respectively. By increasing or decreasing the amount of the resistance $A^5$ in the circuit connections between the thermo-couple D and instrument G, the movement of the contact H on a given change in the furnace temperature, may be decreased or increased. Thus the relative importance of the furnace temperature as compared with the work temperature in controlling the heating of the furnace may be diminished or enhanced.

Figure 2:
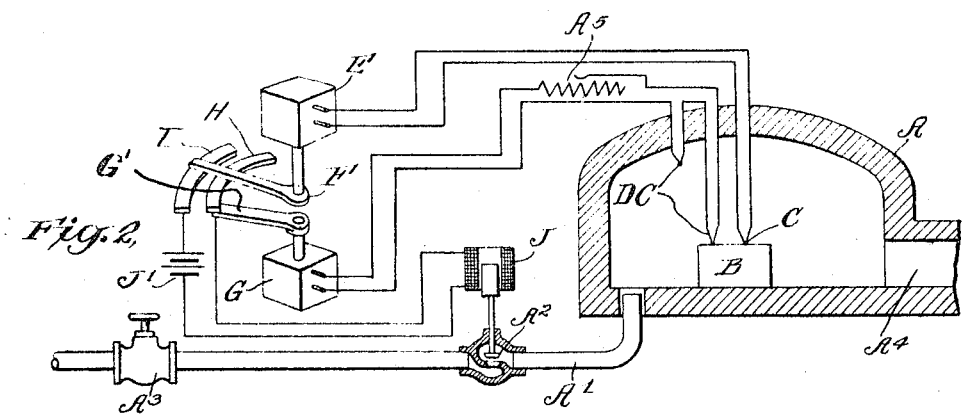
Fig. 2 is a view taken similarly to Fig. 1 illustrating a modified arrangement.

The effect on the supply of heat to the furnace, of a change in the work temperature may also be made of increased importance as compared with the furnace temperature by the simple variation in the apparatus of Fig. 1 shown in Fig. 2. The apparatus shown in Fig. 2 differs from that shown in Fig. 1 only in that the simple thermo-couple D of Fig. 1, responsive directly to the furnace temperature is replaced by a differential thermostat DC having one hot junction responsive to the furnace temperature and the other hot junction responsive to the temperature of the work.

Figure 3:
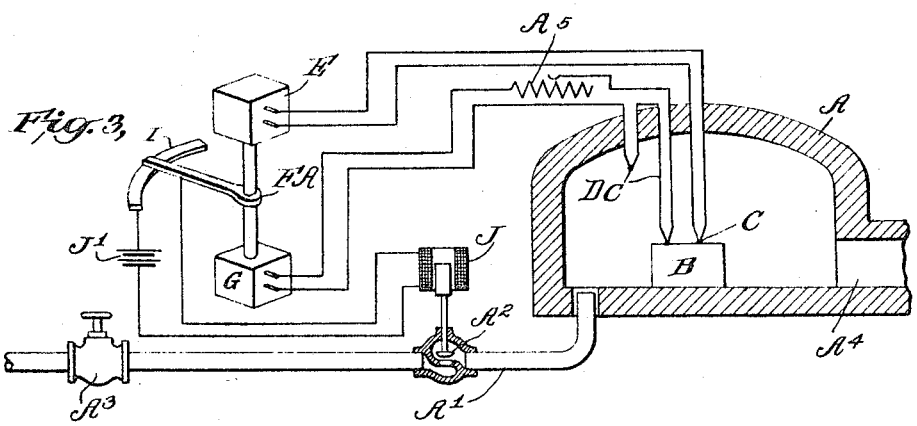
Fig. 3 is a view taken similarly to Fig. 1 illustrating a third arrangement.

With the similar parts of the apparatus shown in Figs. 1 and 2 all proportioned alike, the needle F will move exactly the same in Fig. 2 as in Fig. 1 for similar changes in temperature, but the contact H will have smaller movements in Fig. 2 than in Fig. 1, for the tendency of the hot junction of the couple DC in contact with the work will normally neutralize a portion of the tendency of the other hot junction of the couple to move the arc H in response to the changes of furnace temperature exactly as the arc H is moved in Fig. 1 by the same changes in furnace temperature. The important effect of the change from the apparatus of Fig. 1 exhibited in Fig. 2 is that while the supply of heat is controlled ultimately according to the temperature of the work, the effect of the work temperature can be modified in any desired degree according to the amount by which the furnace temperature exceeds the work temperature. This is advantageous, for example, where it is desired to hold the work for a long time at a uniform, even temperature. The apparatus shown in Fig. 3 differs from that shown in Fig. 2 in that the termo-couples C and DC are both connected in corresponding windings of a differential galvanometer. I have illustrated this galvanometer as composed of elements E and G like the galvanometer elements E and G of Fig. 1, except that in Fig. 3 the two instruments have a common shaft which carries an arm FA sweeping over a stationary contact I. One terminal of the energizing circuit for the cut-off magnet J is connected to the arm FA and the other is connected to the stationary contact I. The operation of the apparatus shown in Fig. 3 is obviously the same in a general way as that of the apparatus shown in Fig. 2. The apparatus shown in Fig. 3 possesses the disadvantage, however, that the contact I does not serve to interrupt the supply of heat to the furnace when the work temperature reaches the desired final temperature, regardless of what the furnace temperature then may be.

Instead of regulating the supply of heat to the furnace by supplying heat at the full rate until a certain thermal condition is reached and then cutting the supply of heat entirely off, as is done with the simple arrangement shown in Figs. 1, 2 and 3, it is in practice ordinarily preferable to provide for a more gradual adjustment of the rate of heat supply to the furnace. This can be accomplished in a variety of ways, examples being illustrated in Figs. 4, 5 and 6.

Figure 4:
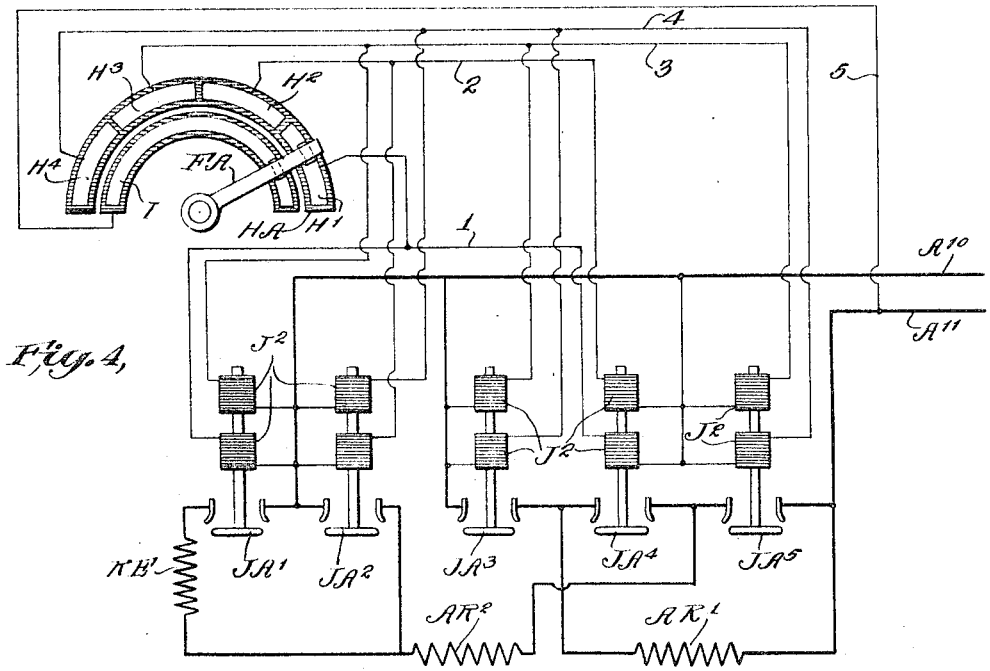
Fig. 4 is a diagram illustrating an arrangement for controlling the heat of an electric resistance furnace.

In Fig. 4 there is employed in lieu of a simple contact H as shown in Figs. 1 and 2, a contact member HA which may be adjusted in response to the furnace temperature, or to the differential between the furnace and work temperatures just as the contact H is adjusted in Figs. 1, 2 and 3. The contact member HA comprises a plurality of contacts $H'$, $H^2$, $H^3$, and $H^4$. The contacts $H^4$, $H^3$, $H^2$, and $H^1$ are successively engaged by the arm FA as the latter moves in a clockwise direction in response to a rise in temperature of the work and the contact member HA moves in the counter clockwise direction in response either to a rise in the temperature of the furnace or to a rise in the differential between the work and furnace temperatures. The contact member HA is shown in Fig. 4 in connection with an electric resistance furnace of which $AR'$ and $AR^2$ are the resistance heating units, and RE represents an external resistance for controlling the current passing through the heating resistances of the furnace proper. $JA'$, $JA^2$, $JA^3$, $JA^4$, and $JA^5$ represent electromagnetic switches or "plunkers" by which the resistances $AR'$, $AR^2$, and RE may be connected in various ways to the electromagnetic switches. Each plunker comprises a plurality of energizing coils $J^2$ and whenever any one of these coils is energized the corresponding switch is closed. The stationary contact I is connected to the supply conductor $A^{11}$ by the conductor 5. The movable contacts $H'$, $H^2$, $H^3$, $H^4$ are connected by conductors 1, 2, 3 and 4 respectively, to the supply conductor $A^{10}$ each through the windings of two or more of the coils $J^2$ of the electromagnetic switches. The connections are such that with the arm FA in the position in which it bridges the contacts I and H⁴, the current passing through conductor 4, will energize one coil J² of, and close each of the switches JA², JA³, and JA⁵. This serves to connect each of the furnace heating resistances AR' and AR² directly across the supply lines A¹⁰ and A¹¹ thus giving the maximum rate of heat supply to the furnace. With the switch arm FA connecting contact I to the contact H³, current passes through conductor 3 and energizes one of the coils J² of, and thereby closes each of the switches JA', JA³ and JA⁵. The closure of these switches connects the furnace heating resistance AR' directly across the supply conductors A¹⁰ and A¹¹, and connects the heating resistance AR² and the regulating resistance RE in series with one another across the conductors A¹⁰ and A¹¹. With the arm FA connecting the contact I to the movable contact H², the conductor 2 passes current for energizing one of the coils J² of, and thereby closes each of the switches JA² and JA⁴. The closure of these switches connects the two furnace heating resistances AR' and AR² in series with one another across the supply conductors A¹⁰ and A¹¹. With the switch arm FA connecting the contact I to the movable contact H', the conductor I passes current for energizing one of the coils J² of, and thereby closes each of the switches JA' and JA⁴. The closure of these switches connects the two furnace heating resistances AR' and AR² and the regulating resistance RE in series across the supply conductors A¹⁰ and A¹¹. With the apparatus shown in Fig. 4, it is apparent that the rate at which the furnace receives heat is varied in progressive steps from a maximum when the switch arm FA engages contact H⁴, to a minimum when the switch arm FA engages the contact H', and that the supply of heat to the furnace is totally interrupted when the movement of the arm FA in the clockwise direction relative to the movable contact member HA or to the stationary contact I carries the arm FA out of contact with either the member HA or contact I.

Figure 5:
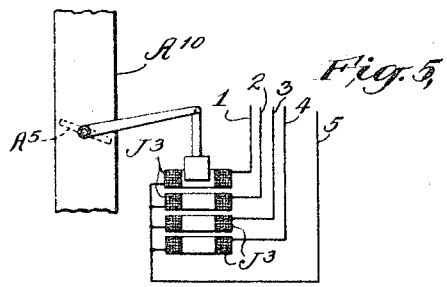
Fig. 5 is a diagram illustrating the use of the portion of the apparatus shown in Fig. 4 for controlling a fuel valve or damper of a flame heated furnace.

In the arrangement shown in Fig. 5 a valve or damper A⁵ controlling the supply of fuel to a furnace through a conduit A¹⁰, or controlling the furnace draft through the same conduit, is progressively advanced in steps from a closed position to a wide open position by the successive energization of a series of coils J³, each energized by a corresponding one of the conductors 1, 2, 3 and 4 and the return conductor 5. The conductors 1, 2, 3, and 4 may be connected to a control mechanism including contacts I and HA and a switch arm FA arranged and operating as in Fig. 4. The operation of the apparatus shown in Fig. 5 will be apparent to those skilled in the art without further explanation.

Figure 6:
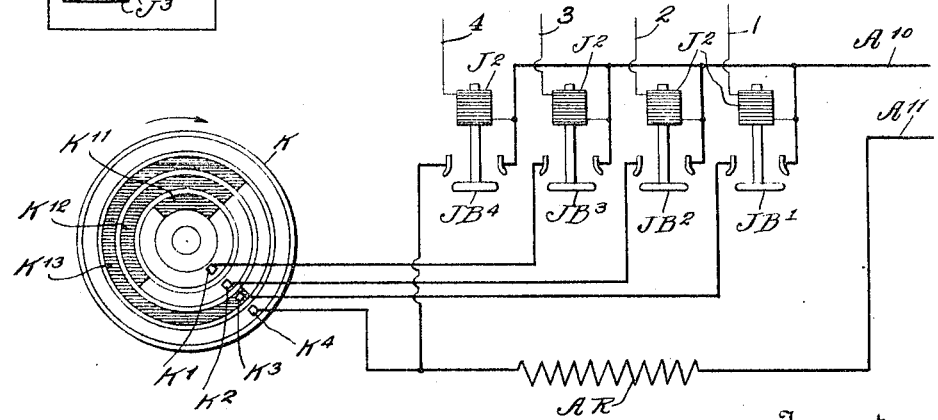
Fig. 6 is a diagram illustrating another mode of controlling an electric resistance furnace.

In Fig. 6 I have illustrated the use of my invention for the control of a furnace wherein the supply of heat to the furnace is intermittently turned on and off at regular intervals. In this form of my invention I make the periods during which the heat is on, relatively shorter, and the alternating periods during which the supply of heat is off, relatively longer, as the furnace temperature conditions approach the condition in which the temperature of the work and the furnace are such that no further heat need be supplied to the furnace to bring the work to the desired final temperature. The apparatus shown in Fig. 6 for accomplishing this comprises an electrical resistance furnace of which AR represents the heating resistance. One terminal of the resistance conductor AR is connected to the supply conductor A¹¹, and the other terminal is connected to a brush K⁴ which bears against a conducting body K rotated by a clock or other motor at a constant speed. The terminal of the resistance AR connected to the brush K⁴ is also connected to the supply conductor A¹⁰ through an electromagnetic switch JB⁴. Other brushes K¹, K², K³, engaging the rotating body K along circular paths at different distances from the center of rotation of the body are connected to the line A¹⁰ each through a corresponding electromagnet switch JB³, JB², JB¹, respectively. The switch closing coils J² for the switches JB¹, JB², JB³ and JB⁴ are energized by currents passing through the conductors 1, 2, 3, and 4 respectively, which may be connected to the movable contacts of a regulating mechanism such as the contacts H¹, H², H³, and H⁴, of the regulating apparatus shown in Fig. 4. A part of the pathway for the brush K¹ comprises a segment K¹¹ of insulating material and parts of the pathways for the brushes K² and K³ comprise insulating segments K¹² and K¹³ respectively. These insulating segments are of different lengths so that, for example, with the switch JB¹ closed, current will pass through the resistance conductor AR between the supply conductors A¹⁰ and A¹¹ through the switch JB¹, and brush K³, rotating body K and brush K⁴ during a quarter of the time required for each complete rotation of the body K. Similarly, with the switch JB² closed, the resistance conductor AR will receive current from the supply conductors A¹⁰ and A¹¹ during one half of the time required for each rotation of the body K. With the control conductor 3 energized and the switch JB³ closed, the resistance AR will receive current during three fourths of the time required for each rotation of the body K, and with control conductor 4 energized and switch JB⁴ closed, the resistance AR will pass current between the conductors A¹⁰ and A¹¹ continuously.

The simple forms of galvanometers which for ease and simplicity of illustration of the principles of my invention I have shown in Figs. 1, 2, and 3 could not well be made both sensitive and powerful enough to permit of their successful use in ordinary practice. For practical use it is necessary to employ one or more sensitive electrical instruments such as a galvanometer or a millivoltmeter to respond to the current flow induced by the temperature measuring thermo-couples and to employ in conjunction with such an instrument or instruments, a suitable relay mechanism through which the furnace control switch valves or dampers are actually adjusted.

In Figs. 7, 8 and 9 I have illustrated somewhat diagrammatically a form of current measuring and relay apparatus suitable for practical commercial use. The apparatus shown in Figs. 7, 8 and 9, comprises a shaft M continuously rotated by a suitable motor RS, and a second shaft L parallel to the shaft M which is intermittently rotated in one direction or another according to the position of the indicating arm R' of the galvanometer R by mechanism hereinafter described. Journalled on the shaft L is a sleeve P² carrying two arms P and P'. The arms P and P' are of conducting material but the sleeve P² may be formed of insulating material or the arms P and P' may be insulated from the sleeve P². A clutch mechanism including a clutch lever O and a cam M¹⁰ carried by the shaft M, locks the sleeve P² to the shaft L during a portion of each revolution of the shaft M. Also journalled on the shaft L is an arm PA which is intermittently locked to the shaft L during a portion of each rotation of the shaft M by means of a clutch including a clutch lever OA and a cam M²⁰ secured to the shaft M. The shaft M also carries two cams M' and M² which operate to close switches N' and N² respectively, each for a portion of each revolution of the shaft M. The various cams are so arranged that the switch N' will be closed during the same portion of each rotation of the shaft L in which the sleeve P² is locked to the shaft L, and at this time the switch N² will be open and the arm PA not locked to the shaft L, while switch N² will be closed and the arm PA locked to the shaft L simultaneously during periods in which the switch N' is open, and the sleeve P² is not locked to the shaft L. The arm P carries a brush or contact P¹⁰ which constantly engages the periphery of a stationary arc shaped conductor Q forming a potentiometer resistance. Similarly, the arm PA carries contact PA¹⁰ which constantly engages the inner surface of the potentiometer resistance Q. The potentiometer resistance Q is connected by conductors 10 and 11 to a battery or other source of current Q¹⁰⁰. The switch N' has one terminal connected to conductor 10, a second terminal connected through a conductor 13 and a brush engaging the hub of the arm P to the contact P¹⁰, a third contact of the switch N' is connected to one terminal of the winding of the galvanometer R, while the fourth contact of the switch is connected to the terminal of the thermo-couple C. The other terminal of the thermo-couple C is connected to the second terminal of the galvanometer R. The connections are such that with the switch N' closed, the potential impressed on the terminals of the winding of the galvanometer R will be the difference between the E. M. F. of the thermo-couple, and the potential drop through the portion of the potential resistance Q between the conductor 10 and the brush P¹⁰.

The switch N² has one terminal connected by a conductor 12 and connector Q¹⁰ to the potential resistance Q at an adjustable distance from the connection of the latter to the conductor 11. A second terminal of the switch N² is connected by a conductor 17 and a brush bearing on the hub of the arm PA to the brush PA¹⁰. A third terminal of the switch N² is connected to one terminal of the windings of the galvanometer R, and the fourth terminal of the switch N² is connected to one terminal of the furnace thermo-couple D. The second terminal of the latter is connected to the winding of the galvanometer R. With the switch N² closed, the voltage impressed on the terminals of the winding of galvanometer R is the difference between the E. M. F. of the thermo-couple D and the drop in potential through the portion of potentiometer resistance between the brush PA and the connector Q¹⁰. The various circuit connections described are so arranged moreover, that when the E. M. F. of the thermo-couple C exceeds the drop of potential in the corresponding portion of the potentiometer conductor Q, the arm R' of the galvanometer R will be swung to the left of its neutral position, while when the E. M. F. of the thermo-couple D exceeds the drop in potential of its corresponding portions of the potentiometer conductor Q the galvanometer arm R' will be swung to the right from its neutral position.

The arm PA carries an arc shaped contact part HB which may be identical with the contact part HA of Fig. 4, and may have its contact portions H', H², H³, and H⁴, connected by conductors 1, 2, 3, and 4, respectively, to any suitable apparatus for controlling the heat of the furnace by which the work B of Fig. 7, is heated. For example, the contacts H′, H², H³, and H⁴ may be connected to the heat control provisions proper of Fig. 6 in the manner illustrated in Fig. 11. The arm P′ carried by the sleeve P² sweeps over the contact portions H′, H², H³, and H⁴ of the contact device HB and normally connects one or another of these contacts to an arc shaped contact IA which bears the same relation to the contact part HB as the contact I does to the contact part HA in Fig. 4.

In the contemplated mode of operation of the apparatus shown in Figs. 7, 8, and 9, whenever the switch N′ is closed and the galvanometer arm R′ is swung away from the neutral position because too much or too little of the potentiometer conductor Q is then included in series with the thermo-couple C to exactly balance the E. M. F. of the latter, the shaft L is automatically adjusted angularly in the direction to shift the arm P and contact $P^{10}$ in the necessary direction to bring about a balance of the thermo-couple C and the drop in potential of the corresponding portion of the conductor Q. Similarly if, when the switch N² is closed, the galvanometer arm R′ is swung in one direction or the other from its neutral position, the shaft L is angularly adjusted to shift the arm PA and thereby the brush $PA^{10}$ in the necessary direction so as to obtain a balance between the E. M. F. of the thermo-couple D, and the drop in potential through the portion of the conductor Q between the brush $PA^{10}$ and the connector $Q^{10}$.

The means for effecting angular adjustments of the shaft L for the purposes just described comprises a motor RS which rotates the cam shaft M through speed reducing gearing including an intermediate shaft S, a pair of ratchet levers T and TA journaled on the shaft L, and simultaneously oscillated toward and away from one another by connections V and VA between the levers and a crank pin S′ carried by the shaft S, an abutment W, and a crosshead X caused to move toward and away from the abutment by a cam S² carried by the shaft S. The galvanometer needle or arm R′ extends between the abutment W and crosshead X and is intermittently clamped between them once during each revolution of the shaft S. The ratchet levers T and TA each carries a pawl T′ for engagement with the ratchet teeth L² on the periphery of ratchet wheel L′ secured to the shaft L. Normally each pawl T′ is held out of engagement with the ratchet teeth L² by a corresponding weighted lever Y which normally oscillates with the corresponding lever T or TA. When the galvanometer arm is clamped between the abutment W and crosshead X at either side of its neutral position, one or the other of the weighted levers Y is thereby engaged and prevented from sharing the immediately following movement of the corresponding lever T or TA. The pawl T′ of the latter then engages the ratchet teeth of the disc L′ and the latter, and thereby the shaft L, is given a rotative movement the extent of which depends on the displacement of the arm R′ from its neutral position.

The parts are so arranged and timed that whenever either switch N′ or N² is closed, the arms T and TA will be oscillated toward one another and the galvanometer arm R′ will be clamped between the abutment W and crosshead X. If the arm R′ is not then in its neutral position, the pawl T′ of one or the other of the rotated levers T and TA will engage and give a partial rotation to the disc L′ and thereby to the shaft L and parts then locked to the latter.

Thus, if with the switch N′ closed the potential of the thermo-couple C exceeds the drop in potential in the portion of the potentiometer resistance Q to the left of the contact $P^{10}$, the galvanometer arm R′ will be swung to the left of its neutral position. In consequence the ratchet lever T will then angularly adjust the disc L′ and thereby the contact $P^{10}$ and arm P′ will be moved in the clockwise direction, thus tending to restore a balance between the E. M. F. of the thermo-couple C and the potential drop between the contact $P^{10}$ and line 10. If on the other hand, the potential drop just referred to exceeds the E. M. F. of the couple C when the switch N′ is closed, the galvanometer arm R′ will be swung to the right and in consequence the contact $P^{10}$ and part P′ will be adjusted in the counter clockwise direction. The apparatus thus sets the part P′ at a position about its axis of rotation which varies with, and is a measure of the temperature of the work B. Similarly the control member HB is adjusted when the switch N² is closed as required to make the angular position of the member HB a measure of the furnace temperature to which the couple D responds. But in the case of the member HB, its adjustment is in the counter clockwise position as the E. M. F. of the couple D increases.

With the apparatus shown in Figs. 7, 8 and 9 the regulating effect of the work and furnace may be varied by shifting the connection $Q^{10}$ along the potentiometer resistance Q. Certain novel features of the apparatus shown in Figs. 7, 8 and 9 not claimed herein are claimed in another application Serial No. 349,303 filed by me Jan. 3rd 1920.

It is desirable in some cases to make provisions for regulating the relative importance of work and furnace temperature changes in such apparatus as is shown in Figs. 7, 8 and 9 analogous to the results which may be obtained with the apparatus shown in Figs. 1, 2 and 3 by adjusting the resistance $A^5$. For example, when the heat capacity of the furnace is large as compared with that of the work, it is desirable that the movement of the arm PA should be greater in comparison to the movement of the arm P' for a given change in the corresponding temperature than when the heat capacity of the furnace is small as compared with that of the work.

A variation in the relative rates of movement of the arms PA and P' on given temperature changes may obviously be had by varying the character of either or both thermo-couples. Thus the movement of the arm PA for a given change in the furnace temperature can be made appreciably greater by the use of a suitable base metal couple D than is obtained with a platinum couple D.

Figure 10:
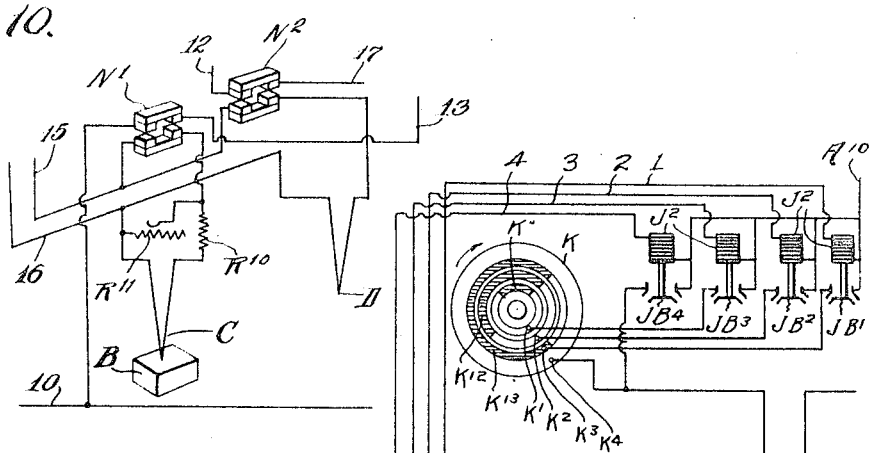
Fig. 10 is a diagram illustrating a modification of a portion of the apparatus shown in Fig. 7.

The same result can be secured also by use of resistances in connection with either thermo-couple as illustrated in Fig. 10 where a resistance $R^{10}$ is placed in series with the thermo-couple C, and the variable resistance $R^{11}$ is placed in shunt to C. A better method of accomplishing this result with such apparatus as is shown in Figs. 7, 8 and 9 is by varying the potentiometer potential changes produced by given movements of the arms $P^{10}$ and $PA^{10}$. An effective way of doing this is to provide separate potentiometer conductors for engagement by the arms $P^{10}$ and $PA^{10}$ and means for adjusting the relative excitation of these potentiometer conductors.

Figure 11:
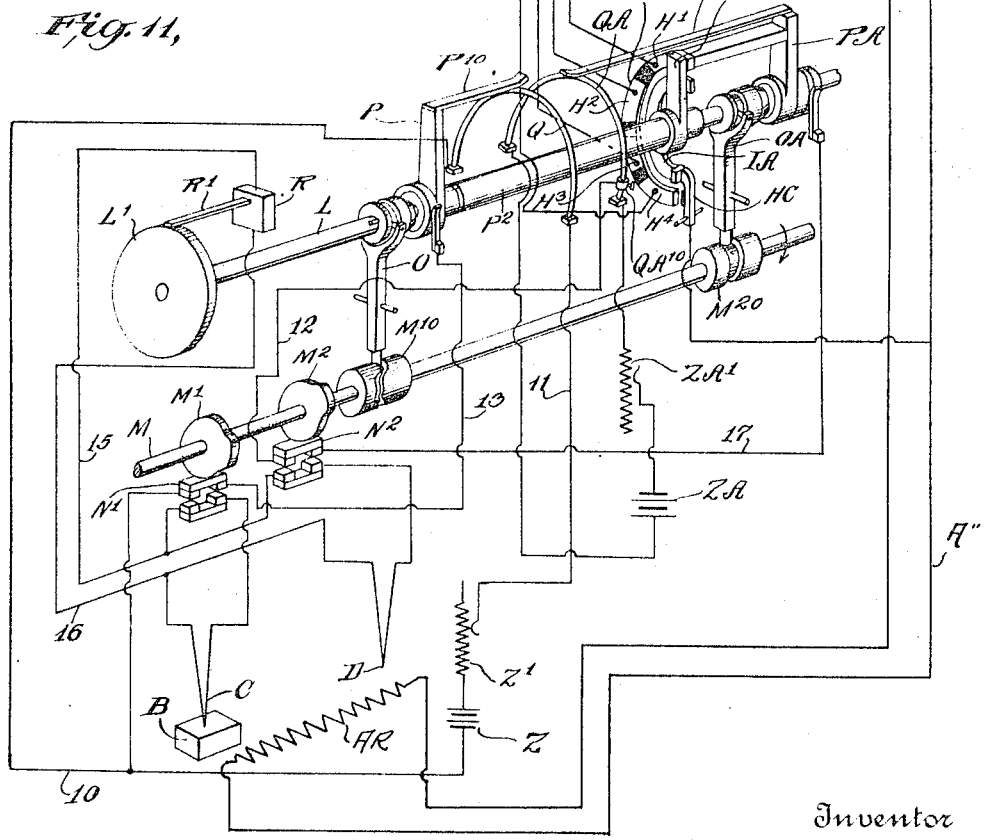
Fig. 11 is a view taken similarly to Fig. 7 illustrating another modification.

The modification of this character illustrated in Fig. 11 differs essentially from the apparatus of Fig. 7 in the provision in addition to the potentiometer conductor Q of a second potentiometer conductor QA. The conductor 12 is connected to the adjustable contact $QA^{10}$ on the conductor QA, and is dismounted from the conductor Q. The conductors Q and QA are connected in separate exciting circuits each including a source of E. M. F. Z or ZA and a variable resistance Z' or ZA'. By adjusting either resistance Z or ZA', a change in the relative movements of the arms P and PA for given changes in the work and furnace temperatures can be secured. In Fig. 11 I have illustrated the use of the current measuring and relay provisions heretofore described in conjunction with heat control provisions proper of the character shown in Fig. 6. The conductors 1, 2, 3, and 4 connect the contacts H', $H^2$, $H^3$, and $H^4$ respectively to the windings of the corresponding switch controlling magnets $J^2$ and therethrough to the heating current supply conductor $A^{10}$; the stationary contact IA being connected to the other heating current supply conductor $A^{11}$. To prevent overheating of the furnace, provision may be made for cutting off the supply of heat when the furnace reaches a certain temperature regardless of what the work temperature may then be. This is accomplished in Fig. 11, for example, by having the segment HB carried by the arm PA, open a switch HC through which the heating circuit supply conductor $A^{11}$ is connected to the contact IA, on a movement of the arm PA corresponding to the maximum rise in furnace temperature desired.

While in accordance with the provisions of the statutes I have illustrated and described the best forms of my invention now known to me, it will be apparent to those skilled in the art that changes may be made in the form of apparatus and methods disclosed without departing from the spirit of my invention and certain features of my invention may sometimes be used to advantage without a corresponding use of other features.

Having now described my invention, what I claim as new and desire to secure Letters Patent, is:

1. The method of heat regulation which consists in creating an effect tending to increase or decrease the heat supply to the heating device as the temperature of the latter falls and rises, and creating an effect tending to increase and decrease the heat supply to the heating device as the temperature of the work falls and rises, and varying the heat supply to the heating device in response to variations in the resultant of said effects.

2. The improvement in furnace temperature regulation which consists in utilizing the temperature of the furnace and the work being heated therein to decrease the supply of heat to the furnace as the work approaches a desired maximum temperature and when said maximum temperature exceeds the actual work temperature by an amount (i. e. number of degrees) which is dependent upon and varies with the excess of the furnace temperature over the work temperature.

3. The improvement in furnace temperature regulation which consists in utilizing the temperatures of the furnace and the work being heated therein, as the temperature of the work approaches a desired maximum and while still below that maximum, to diminish the supply of heat to the furnace by an amount which is dependent upon, and varies with the excess in furnace temperature over the work temperature.

4. The combination with a heater, of means responsive to the temperature of the heater, means responsive to the temperature of the work being heated, and mechanism controlling the heating of the heater in response to the joint action on said mechanism of the said devices each of which acts on said mechanism with a tendency to increase or decrease the supply of heat to the heater accordingly as the temperature to which the device responds decreases or increases.

5. The combination with a heater of a device responsive to the temperature of the heater, a second device responsive to the temperature of the work being heated, mechanism controlling the heating of the heater in response to variations in the combined action of the two devices, each of which acts on the mechanism with a tendency to decrease the heating of the heater as the temperature to which the device responds increases, and provisions for interrupting the supply of heat to the heater upon a predetermined rise in work temperature, regardless of the heater temperature then prevailing.

6. The combination with a heater, of a device responsive to the temperature of the heater, a second device responsive to the temperature of the work being heated, mechanism controlling the heating of the heater in response to variation in the combined action of the two devices, each of which acts on the mechanism with a tendency to decrease the heating of the heater as the temperature to which the device responds increases, and provisions for interrupting the supply of heat to the heater upon a predetermined rise in the heater temperature, regardless of the work temperature then prevailing.

7. The combination with a heater of a device responsive to the temperature of the heater; a second device responsive to the temperature of the work being heated, mechanism controlling the heating of the heater in response to variation in the combined action of the two devices, each of which acts on the mechanism with a tendency to decrease the heating of the heater as the temperature to which the device responds increases and provisions for interrupting the supply to the heater when a predetermined temperature is reached by either the heater or the work.

8. The combination with a heater, of means controlling the heating thereof consisting of a device responsive to the temperature of the heater, a member moved in one direction or another as the temperature of said device rises or falls, a device responsive to the temperature of the work, a second member moved as said second device rises and falls in temperature in directions opposite, respectively, to the directions in which the first mentioned member is moved on an increase or decrease in the temperature to which the first mentioned device is subjected and heater temperature adjusting means controlled by these members and tending to reduce the supply of heat on a relative movement of the members resulting from a rise in the temperature of either device and to increase the supply of heat on a relative movement in the opposite direction, said controlling means, including provisions for varying the extent of movement of one of said members on a given change in temperature of the corresponding device.

9. The combination with a heater, of control apparatus therefor, comprising two members separately adjustable and each comprising a potentiometer contact and a circuit control part which co-operates with the circuit control part of the other member to adjust the temperature of the heater, a thermo-electric device responsive to the temperature of the heater, a thermo-electric device responsive to the temperature of the work being heated, and means co-operating with said devices, and including electrical measuring means and a separately excited potentiometer conductor for and engaged by each of said potentiometer contacts for adjusting one of said control parts in one direction on a rise in the E. M. F. of one of said devices and in the reverse direction on a fall of said E. M. F., and means for adjusting the other circuit controlling part in said reverse direction on a rise in the E. M. F. of the other devices and in said one direction on the fall in the last mentioned E. M. F.

10. The combination with a heater, of means controlling the heating thereof consisting of a device responsive to the temperature of the heater, a member moved in one direction or another as the temperature of said device rises or falls, a second device responsive to the temperature of the work, a second member moved as said second device rises and falls in temperature in directions opposite, respectively, to the directions in which the first mentioned member is moved on an increase or decrease in the temperature to which the first mentioned device is subjected and heater temperature adjusting means controlled by these members and tending to reduce the supply of heat on a relative movement of the members resulting from a rise in the temperature of either device and to increase the supply of heat on a relative movement in the opposite direction.

11. The combination with a heater, of control apparatus therefor, comprising two members separately adjustable angularly about the same axis and each comprising a potentiometer contact and a circuit control part which co-operates with the circuit control part of the other member to adjust the supply of heat to the heater, a thermo-couple responsive to the temperature of the heater, a thermo-couple responsive to the temperature of the work being heated, and means co-operating with said thermo-couples and including electrical measuring means and potentiometer means engaged by said potentiometer contacts for adjusting one of said control parts in a clockwise direction on a rise in the E. M. F. of one of the thermo-couples, and in the reverse direction on a fall of said E. M. F. and means for adjusting the other circuit controlling part in a counter clockwise direction on a rise in the E. M. F. of the other thermo-couple and in a reverse direction on a fall in the E. M. F. of the last mentioned thermo-couple.

12. The combination with a heater of control mechanism therefor, comprising a potentiometer resistance, a pair of members separately adjustable about the same axis and each comprising a potentiometer contact energizing said resistance and a circuit controlling member normally engaging the circuit controlling member of the other, a work thermo-couple subjected to the temperature of the work, provisions for adjusting one of the said potentiometer contacts as required to maintain a balance between the E. M. F. of the thermo-couple and the drop in potential through a portion of the said resistance between one end of the latter and the last mentioned contact, a thermo-couple responsive to the temperature of the heater, provisions for adjusting the second potentiometer contact as required to maintain a balance between the E. M. F. of the heater thermo-couple and the drop in potential through a portion of the resistance between the last mentioned contact and the second end of the potentiometer resistance, and heating means controlled by said circuit controlling member.

13. The combination with a heater of control mechanism therefor, comprising a potentiometer resistance a pair of members separately adjustable about the same axis and each comprising a potentiometer contact energizing said resistance and a circuit controlling member normally engaging the circuit controlling member of the other, a work thermo-couple subjected to the temperature of the work, provisions for adjusting one of the said potentiometer contacts as required to maintain a balance between the E. M. F. of the thermo-couple and the drop in potential through a portion of the said resistance between one end of the latter and the last mentioned contact, a thermocouple responsive to the temperature of the heater, provisions for adjusting the second potentiometer contact as required to maintain a balance between the E. M. F. of the heater thermo-couple and the drop in potential through a portion of the resistance between the last mentioned contact and the second end of the potentiometer resistance, heating means controlled by said circuit controlling member, and means for adjusting the amount of potentiometer resistance included in one of the said portions to alter the character of heat control.

14. The combination with a heater of means regulating the supply of heat thereto including control mechanism alternately responsive at regular intervals to the temperature of the heater and to the temperature of work being heated therein and tending to decrease the supply of heat to the heater on a rise in either of said temperatures.

15. The combination with a heater, of a device responsive to the temperature of the heater, a device responsive to the temperature of the work being heated, means supplying heat intermittently to the heater, and mechanism for varying the ratio between the time in which heat is being supplied to the time in which the supply of heat is interrupted, in response to the combined action of the two devices, each of which acts on the mechanism with a tendency to decrease said ratio as the temperature to which the device responds increases.

16. The combination with a heater, a pair of potentiometer resistances, a pair of members separately adjustable and each comprising a potentiometer contact engaging one of said resistances and a circuit controlling member normally engaging a circuit controlling member of the other, a thermo-couple responsive to the temperature of the work, provisions for adjusting one of said members as required to maintain a balance between the E. M. F. of said thermo-couple and the drop in potential through the portion of the corresponding resistance at one side of the said contact engaging it, a thermo-couple responsive to the temperature of the heater, provisions for adjusting the second member as required to maintain a balance between the E. M. F. of the heater thermo-couple and the drop in potential through the portion of the other resistance at one side of the said contact engaging it, the parts being so disposed that the movements of the two adjustable members are in opposite directions for variations in the same direction of the temperatures of the two thermo-couples, and means controlled by said circuit controlling members for regulating the supply of heat to the heater.

17. The combination with a heater, a pair of potentiometer resistances, a pair of members separately adjustable and each comprising a potentiometer contact engaging one of said resistances and a circuit controlling member normally engaging a circuit controlling member of the other, a thermo-couple responsive to the temperature of the work, provisions for adjusting one of said members as required to maintain a balance between the E. M. F. of said thermo-couple and the drop in potential through the portion of the corresponding resistance at one side of the said contact engaging it, a thermo-couple responsive to the temperature of the heater, provisions for adjusting the second member as required to maintain a balance between the E. M. F. of the heater thermo-couple and the drop in potential through the portion of the other resistance at one side of the said contact engaging it, the parts being so disposed that the movements of the two adjustable members are in opposite directions for variations in the same direction of the temperatures of the two thermo-couples, means for adjusting the potential drop through one or both of said resistances and means controlled by said circuit controlling members for regulating the supply of heat to the heater.

18. The combination with a heater of a thermo-electric device responsive to the temperature of the heater, a thermo-electric device responsive to the temperature of the work, a pair of slide wires, a pair of movable members one in contact with each of said slide wires, means including electrical measuring apparatus and electrical connections between each device and a corresponding one of said members for adjusting the latter in response to variations in the temperature of the said device to which it is connected, and means for regulating the supply of heat to the heater in accordance with the relative positions of said members.

19. The subject matter of claim 10, and in combination therewith means for varying the movements imparted to each of the said members specified in claim 10 in response to changes in the temperatures to which the devices moving said members respond.

Signed at New York, in the county of New York and State of New York, this second day of February A. D. 1920.

GEORGE HERBERT GIBSON.